(12) United States Patent
Bathurst et al.

(10) Patent No.: US 7,031,865 B2
(45) Date of Patent: Apr. 18, 2006

(54) UNIVERSAL SENSOR ADAPTER

(75) Inventors: Bruce M. Bathurst, Brookfield, WI (US); Gregory S. Retzlaff, Menomonee Falls, WI (US)

(73) Assignee: AquaSensors LLC, Brookfield, WI (US)

( * ) Notice: Subject to any disclaimer, the term of this patent is extended or adjusted under 35 U.S.C. 154(b) by 138 days.

(21) Appl. No.: 10/635,057

(22) Filed: Aug. 6, 2003

(65) Prior Publication Data

US 2005/0033540 A1 Feb. 10, 2005

(51) Int. Cl.
*G06F 19/00* (2006.01)

(52) U.S. Cl. ...................... 702/117; 374/208

(58) Field of Classification Search ............... 702/117, 702/130, 136, 118; 374/1, 152, 208
See application file for complete search history.

(56) References Cited

U.S. PATENT DOCUMENTS

| | | | |
|---|---|---|---|
| 4,149,419 A | 4/1979 | Connell, Jr. et al. .......... 73/621 |
| 4,195,515 A | 4/1980 | Smoll .................... 73/194 EM |
| 4,467,273 A | 8/1984 | Rudolph et al. .......... 324/65 R |
| 4,899,586 A | 2/1990 | Koneval et al. .............. 73/431 |
| 5,205,175 A | 4/1993 | Garza et al. .................. 73/628 |
| 5,363,690 A | 11/1994 | Evangelista et al. ....... 73/31.05 |
| 5,475,384 A * | 12/1995 | Manenti et al. ........ 340/870.04 |
| 5,946,641 A | 8/1999 | Morys ......................... 702/91 |
| 5,948,962 A | 9/1999 | Matthiessen ................ 73/23.2 |
| 6,053,031 A | 4/2000 | Kullik et al. .............. 73/31.05 |
| 6,079,286 A | 6/2000 | Struble ...................... 73/866.5 |
| 6,435,045 B1 | 8/2002 | Chen et al. ................ 73/866.5 |
| 6,446,512 B1 | 9/2002 | Zimmerman et al. .... 73/861.12 |
| 2003/0187606 A1* | 10/2003 | Curry ........................ 702/136 |

OTHER PUBLICATIONS

IEEE Std 1451.2-1997 "IEEE Standard for a Smart Transducer Interface for Sensors and Actuators—Transducer to Microprocessor Communication Protocols and Transducer Electronics Data Sheet (TEDS) Formats", 120 pages.*

* cited by examiner

*Primary Examiner*—Edward Raymond
(74) *Attorney, Agent, or Firm*—Michael Best & Friedrich LLP

(57) ABSTRACT

A sensor assembly. The sensor assembly includes a transducer, a memory element to store a plurality of transducer signatures, and a processor to identify the transducer using the transducer signatures, to process the environmental characteristic using the identified transducer signatures and the adaptive algorithm, and to output the processed environmental characteristics.

40 Claims, 3 Drawing Sheets

UNIVERSAL SENSOR ADAPTER

BACKGROUND OF THE INVENTION

The present invention relates to a measuring apparatus, and particularly, an electronic measuring device.

Measuring apparatus such as transducers are generally used to measure physical and chemical phenomena. Once the phenomena has been measured, the phenomena is usually converted to a readable format for a user. In the example of transducers, different physical transducer electrodes will be used to sense different environments. More particularly, different environments may have different physical and chemical compositions, and therefore, different transducers or sensing electrodes may be required to perform a measurement. In other applications, the caustic or acidic nature of the environment necessitates frequent replacement of the transducers. In any case, replacing the transducers generally requires manual adjustment and calibration of the connecting hardware that performs the conversion and calibration.

SUMMARY OF THE INVENTION

Manual adjustment and calibration can be very difficult, especially in harsh environments. Thus, a sensing assembly that automatically recognizes calibrated transducer parameters, sets up transducer specific hardware for a specific transducer from a plurality of transducers, configures to measure either currents or voltages, conditions the amplitude and frequency of excitation, and adjusts the amplitude and frequency of the resulting electrical signal will be welcome by users of such sensors.

Accordingly, the present invention provides a sensor assembly. The sensor assembly includes a transducer that is configured to sense an environmental characteristic, a memory element that is coupled to the transducer and configured to store a plurality of transducer signatures, and a processor coupled to the memory. The processor is also configured to store an adaptive algorithm, to identify the transducer using the transducer signatures, to process the environmental characteristic using the identified transducer signatures and the adaptive algorithm, and to output the processed environmental characteristics.

The present invention also provides a sensor assembly that includes a sensing head and an adapting body. The sensing head has a transducer that is configured to sense an environmental characteristic, and a memory element that is coupled to the transducer and configured to store a plurality of transducer signatures. The adapting body is coupled to the sensing head to receive the transducer signatures and the environmental characteristic from the sensing head. The adapting body also has a processor that is configured to store an adaptive algorithm, to identify the transducer using the transducer signatures, and to process the environmental characteristics using the identified transducer signatures and the adaptive algorithm to generate an output representative of the environmental characteristic.

Furthermore, the present invention also provides a method of sensing an environmental characteristic with a transducer assembly. The transducer assembly has a transducer head that has a memory, and is coupled to a transducer body that includes a processor. The method includes the steps of retrieving a plurality of transducer signatures from the memory, and processing the transducer signatures to identify the transducer at the processor. Thereafter, the method includes the steps of sensing an environmental characteristic using the transducer, and conditioning the environmental characteristic using the processor with an adaptive firmware stored in the transducer body. The method then involves outputting the conditioned environmental characteristics.

Other features and advantages of the invention will become apparent to those skilled in the art upon review of the following detailed description, claims, and drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION OF THE PREFERRED EMBODIMENT

Figure 1:
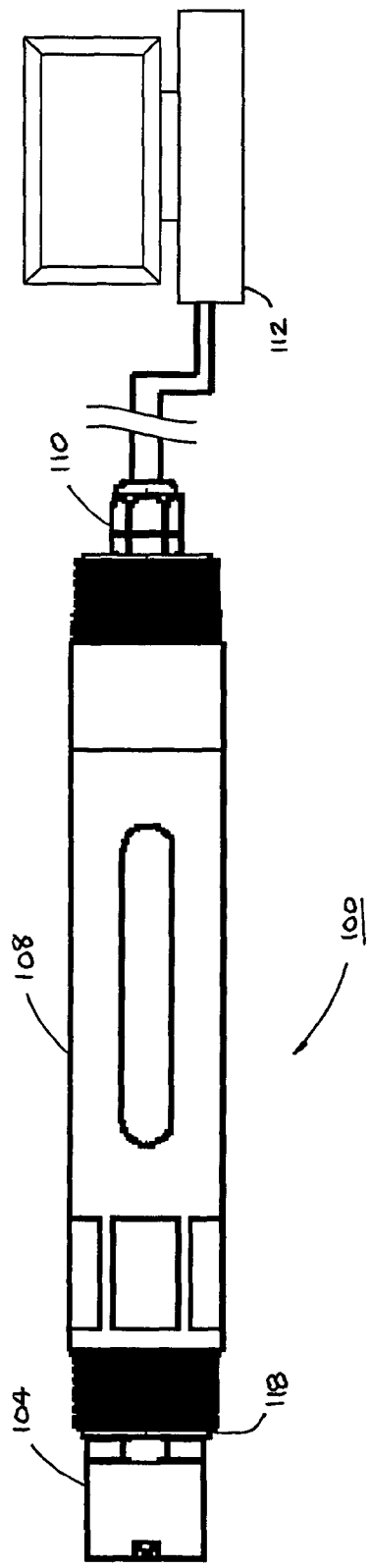
FIG. 1 an illustration of a transducer assembly embodying the present invention.

FIG. 1 illustrates of a sensor assembly, or a transducer assembly 100 embodying the present invention. The transducer assembly 100 includes a transducer housing, a sensing head, or a transducer head 104, a body housing, an adapting body, or a transducer body 108, a removably connectable sensor communication adapter 110, and a reporting device 112. A family of transducer heads 104 can be interchangeably coupled to the transducer body 108. To accommodate the interchangeability of the head 104, the transducer head 104 will include a standard connector 118 (shown in FIG. 2) that can be coupled to any transducer body 108. Therefore, the standard connector 118 will have generally standardized dimensions and couplings.

Figure 2:
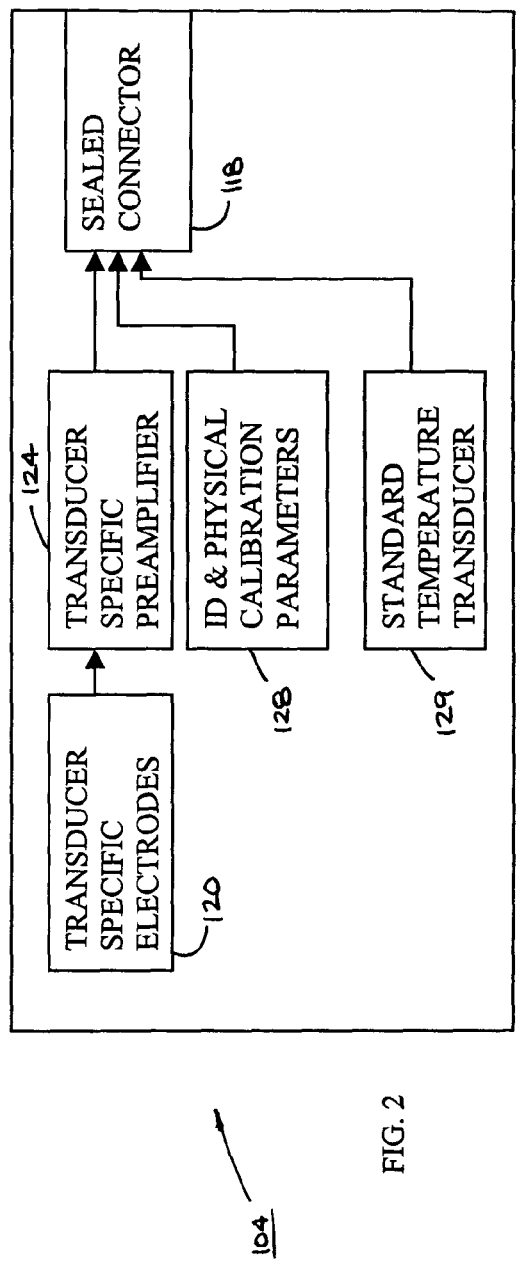
FIG. 2 shows a block diagram of a transducer head embodying the present invention.

The transducer head 104 is further detailed in a block diagram in FIG. 2. The transducer head 104 generally includes an electrode module 120 that houses at least one transducer specific electrode. Different transducer electrodes are used in the head 104 to measure or to sense different environmental characteristics, i.e., physical characteristics of ambient liquids and gases. For instance, when conductivity sensor is attached, the transducer body 108 will read the transducer calibration variables from the conductivity transducer head, and use the new transducer calibration variables to convert the readings into appropriate engineering unit such as microsiemens ($\mu S/cm$) instead of pH.

Exemplary transducer types include pH, oxidation reduction potential ("ORP"), dissolved oxygen, ozone, chlorine, contacting conductivity for liquids, non-contacting conductivity for liquids, atmospheric gases, turbidity using environmental protection agency ("EPA") approved optical techniques, suspended solids using optical techniques, spectroscopy, biosensors, and the like. Each of these transducer types is constructed with measurement specific electrodes 120.

Each transducer head 104 also provides a preamplifier circuitry 124 and a plurality of electronic signatures that are stored in a memory module 128. These electronic signatures help to identify the type of measurement, and the types of transducers, for example. Exemplary signatures include transducer identification, the specific calibration parameters required for accuracy, factory assembly information needed for unique identification of the transducer head 104, configuration instructions, and transducer calibration scaling data. Furthermore, the transducer head 104 is sealed from the environment, and generally includes a temperature transducer 129 to sense a temperature of the transducer to accurately accommodate changes in the transducer due to a change of internal and external temperatures.

Figure 3:
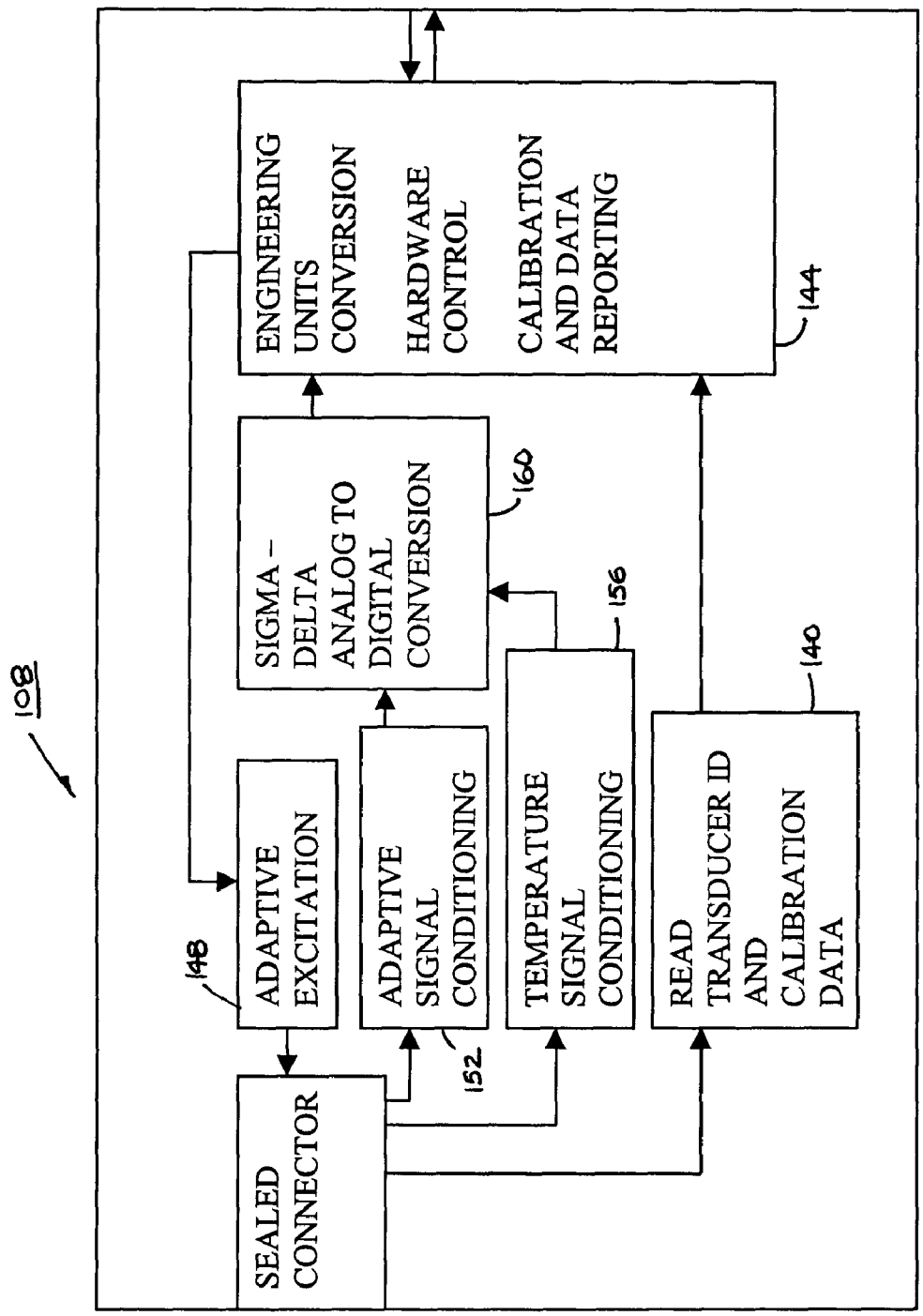
FIG. 3 shows a block diagram of a transducer body embodying the present invention.

FIG. 3 shows a block diagram of the transducer body 108 embodying the present invention in FIG. 1. Similar to the transducer head 104, the transducer body is sealed from the environment, and also includes a body memory module 140 that stores coefficients representing a plurality of calibration parameters. Once the transducer body 108 is coupled to the transducer head 104 via the connector 118, the transducer body 108 will communicate with the transducer head 104 using a processing unit or a processor 144, and with the reporting device 112 via the sensor communication adapter 110. The transducer body 108 and the transducer head 104 are constructed such that the assembly 100 can be completely submerged in a measurement environment. (Exemplary processors include AduC834 Microprocessor from Analog Devices and Intel 8051C.) The transducer body 108 is so constructed that when a transducer head or reporting device is damaged, it can be replaced without rewiring and manually reconfiguring the assembly 100.

When a new transducer head 104 is plugged in to the assembly 100, the transducer body 108 reads a transducer ID, a set of configuration instructions and a set of transducer calibration scaling data from the memory 128. The processor 144 then sets up the signal conditioning electronics using a plurality of input/output ("I/O") controlled analog switches to meet excitation and sensing requirements of the transducer 104. The signal is then converted from analog to digital and scaled into calibrated engineering units using calibration parameters that were stored. For example, if a user pulls off a transducer head 104 from the assembly 100, the processor 144 will first recognize that the transducer head 104 has been removed. As a result, no valid transducer identification is initially available, and the reporting device 112 will report or display error messages. Meanwhile, hardware settings relating to the removed transducer head are kept at the processor 144 and the signal conditioning electronics. Once a new transducer head 104 has been inserted into the assembly 100, the processor 144 retrieves a transducer head identification from the newly inserted head 104 within a short period of time, for example, one second. Thereafter, the hardware setting of the signal conditioning electronics are reconfigured, and the assembly will begin reporting new measurements. For example, when a pH sensor head has been removed from the transducer body 108 for cleaning. The transducer body 108 will detect that the pH sensor has been removed, and stops reporting pH and temperature readings. Instead, the transducer body 108 sends a message to report that no sensor is attached. If a new pH sensor is attached, the transducer body 108 will detect that a sensor head has been attached. The transducer body 108 will also detect a plurality of transducer calibration variables, and update a plurality of engineering unit conversion factors needed to provide accurate pH and temperature readings. However, if a different type of transducer is attached, the transducer body 108 will reconfigure the analog signal conditioning electronics, e.g. 148, 152, and 156 to convert the attached sensor type into calibrated engineering units.

Particularly, the transducer body 108 includes a plurality of adaptive electronics or circuitry. For example, the transducer body 108 includes adaptive excitation circuitry 148, an adaptive signal conditioning module 152, and a temperature signal conditioner 156. Being configured to read different communication protocols, the processor 144 repeatedly detects or retrieves a transducer identity and a plurality of corresponding calibration coefficients of the transducer head 104 connected to the transducer body 108. Once the transducer identity and the corresponding calibration coefficients have been detected, the processor 144 adjusts some switches that are coupled to the adaptive excitation circuitry 148, the adaptive signal conditioning module 152, and the temperature signal conditioner 156. Specifically, the switches are adjusted to optimize and to reconfigure the adaptive electronics or circuitry to read the sensed signal sent from the transducer head 104. Furthermore, the transducer head 104 can also measure temperature through a temperature sensing element such as a PT 1000.

Furthermore, the processor 144 is configured to adjust switches connected to the adaptive excitation circuitry 148. The adaptive excitation circuitry 148 then provides signals for transducer excitation as a combination of different voltages and currents excited at different frequencies, for example, from 0 to 2 volts and from 0 to 100 mA at a frequency between DC and 6000 Hz, at a resolution of 1 $\mu$V or 1 pA. The processor 144 meanwhile adjusts the adaptive signal conditioning module 152 such that the adaptive signal conditioning module 152 generates a set of adaptive signal conditioning coefficients to be processed together with the excited signals from the transducer head 104. Similarly, the temperature signal conditioner 156 is adjusted to provide a set of temperature signal conditioning coefficients. These analog signals are thereafter converted to a digital format using a pair of sigma-delta analog-to-digital converters 160.

Based on the read identification and calibration coefficients, the processor 144 also chooses a corresponding calibrating or conversion algorithm to process the signals, and to provide an appropriate set of calibrated engineering units to the signals sensed by the transducer head 104. The processor 144 will also output or report the calibrated signals and units through the sensor communication adapter 110 to the removably connected reporting device 112. The processor 144 is also specifically configured to report the signals on a real-time basis. For example, a real-time calendar clock can be implemented to time stamp the output signals. If the sensor assembly 100 is battery powered, the calibrated signals can be reported at a user-definable reporting rate. For example, the sensor assembly 100 can be configured to report the calibrated signals at a reporting rate of 2 Hz (twice per second), 0.0167 Hz (once per minute), or 0.0033 Hz (once per five minutes). In the limited power case, a wake-up timer can be used to wake the processor 144 for continuous sensing at a specific rate.

Similar to the transducer head 104, the removably connectable communication adapter 110 is also configured to be modular or interchangeably couplable, and sealed from the ambient environment. Specifically, the invention provides a variety of removably connectable communication adapters 110 that can be coupled to the transducer body 108 to communicate with different reporting devices 112. Since the processor 144 outputs the calibrated signals in digital format, the reporting device 112 generally reports the calibrated signals in digital format. However, if it is desired that the reporting device 112 reports in analog format, a digital-to-analog converter can be used to convert the digital signals and an analog reporting element of the reporting device can be used to report an analog format of the calibrated signals. Similar to replacing the transducer head 104 as described earlier, the reporting device 112 can be attached to and removed from the transducer body 108. The transducer body 108 will similarly detect if a reporting device 112 has been attached or removed, and will make similar adaptation processes as in the case of the transducer head replacement scenario.

Generally, the communication protocol used by the reporting device 112 is automatically detected once coupled to the transducer body 108 via the sensor communication adapter 110. Particularly, the sensor communication adapter 110 can be coupled to a variety of reporting devices 112 such as a PC via a USB port or an RS-232 serial port, an industrial PLC, a telemetry system, a battery-backed data logging system, a local data display and keypad, a personal digital assistant ("PDA") such as a Palm Pilot® brand PDA or a multi-sensor adapter module. The reporting device 112 is configured to use communication protocols such as TCP/IP, MODBUS, PC—ASCII, and the like. The reporting devices 112 are some times used as recording devices. In this way, recording devices such as a personal computer, an industrial PLC, a data logging system, and the like, can also be coupled or hardwired to the transducer body 108 via the sensor communication adapter 110 to report and record continuously.

The assembly 100 continually verifies the identification of the transducer head 104 and applies the appropriate signal conditioning controls to obtain calibrated engineering units measurements. The assembly 100 also allows the transducer head 104 to be changed at any time, and the processor is configured to adapt to any changes quickly. By continually checking the status of the transducer head 104, the assembly 100 can automatically adjust to changes within a measurement cycle.

Figure 4:
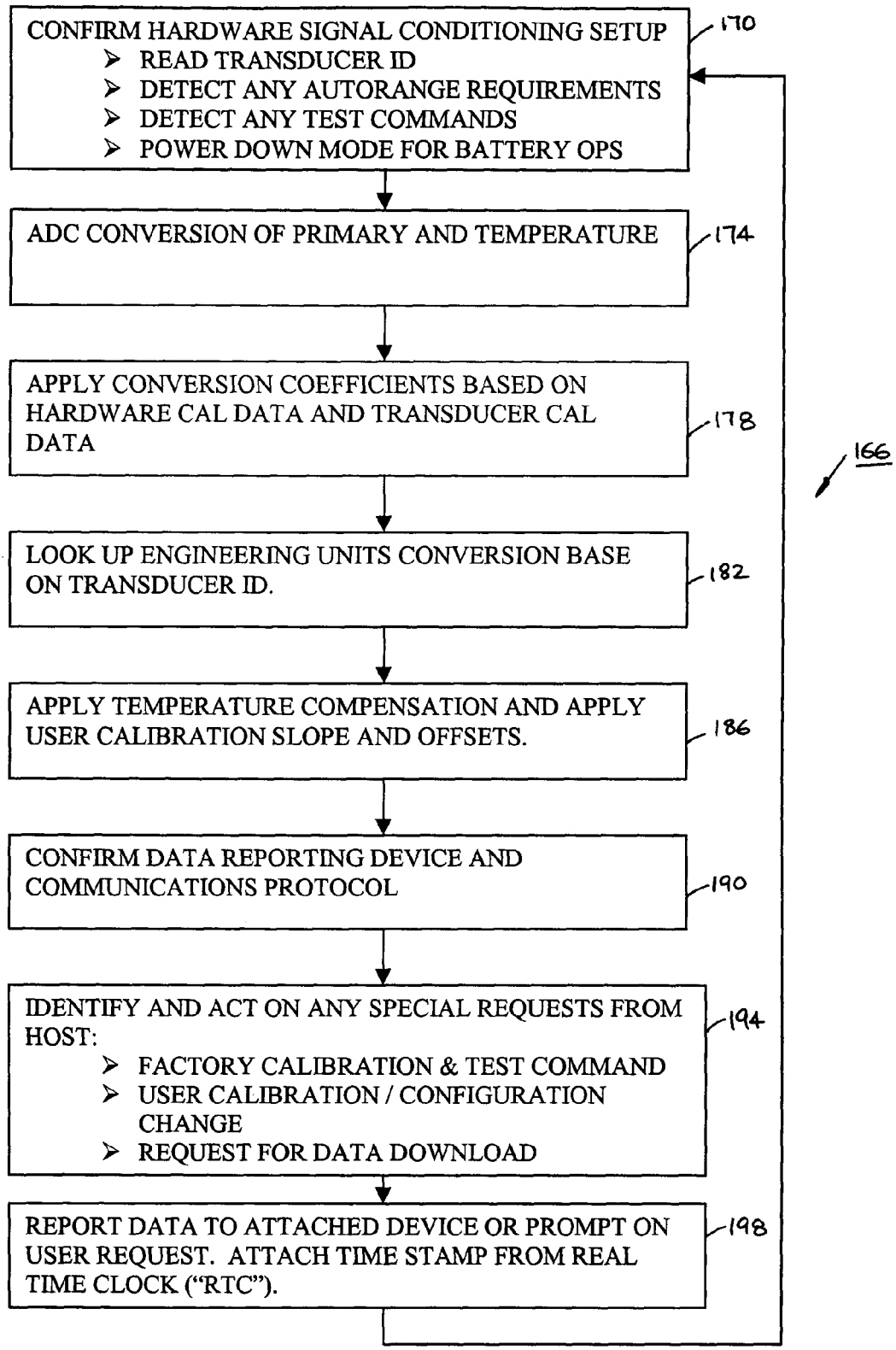
FIG. 4 shows a system flow diagram embodying the present invention.

FIG. 4 shows a system operational flow diagram 166 illustrating the operations of the assembly 100. At step 170, the assembly 100 verifies a transducer status. For example, assembly 100 will verify if a transducer head is attached. If a transducer head 104 has not been attached, or has been removed, the assembly 100 will report no sensor connected as described earlier. Based on the last measurement, the assembly 100 will perform an auto-ranging process in which the gain of various signals sensed is adjusted. Particularly, if the measurement from the last reading is within a low measurement threshold, the gain will be adjusted, or increased in the example.

At step 170, the assembly 100 will also determine if a host computer has taken the assembly 100 "off-line," and entered the assembly 100 into a configuration mode. Once the assembly has entered the configuration mode, parameters of the assembly 100 can be tested or altered through sample calibration, unit changes, filter changes and the like. In the configuration mode, normal transducer readings are suspended, and the assembly 100 waits for instructions. The assembly 100 can also be configured with a number of computer communications devices such as a standard personal computer, a personal digital assistant ("PDA") such as a Palm Pilot® brand PDA, a programmable logic controller, or a customized embedded controller specifically designed to display and record data from the assembly 100.

Particularly, a host computer is any device that can communicate with the assembly 100 using one of several digital communications protocols such as PROFIBUS, MODBUS, and DEVICENET. Furthermore, the host computer can be configured to display and record measurement data from the transducer. When the host computer is used to configure, calibrate or diagnose faults, the assembly 100 is taken off line, and responds to a variety of requests. The requests to which the assembly 100 is configured to respond include adjust data filter settings, calibrate temperature, calibrate transducer parameters (such as pH, ORP, DO, conductivity, turbidity, ozone), change units of measure, or loading new software into the transducer body 108 (for example, upgrades and such).

Referring back to FIG. 4, the assembly 100 will also verify at step 170 the type of recording device 112. For example, if the assembly 100 is battery powered the assembly 100 will take samples at a slower rate and shut down when not taking readings to conserve battery power. Once the status of the assembly 100 is verified, readings of the primary measurement type (pH, ORP, conductivity, Dissolved Oxygen and so on) and the temperature are automatically taken at step 174. The measured data and temperature which are analog, are then conditioned at the single conditioning electronics. The conditioned measurement data and temperature are then converted into their digital equivalents, respectively.

At steps 178, 182, and 186, both the digital measurement data and the temperature are converted into calibrated engineering units such as pH, $\mu$/cm, ° C., ° F., and the like. Specifically, the digital measurement and temperature are data converted to a set of uncompensated engineering units using a combination of look-up tables and pre-programmed formulas. More specifically, two unit counts are generated during the analog-to-digital process for the measurement data and the temperature. The look-up tables and formulas then relate the counts to a set of uncompensated engineering units.

At step 182, the measurement data and the temperature are stored in the transducer body 108. Based on the transducer identification read, the processor 144 will also fetch for a set of temperature compensation parameters. The temperature compensation parameters generally include a slope and an offset. The uncompensated engineering units, are thereafter temperature compensated using the slope and the offset at step 186.

At step 190, the transducer body 108 will report the compensated engineering units to the reporting device 112. At this point, the processor 144 will also check for any special instructions from the host computer. Specifically, the compensated engineering units can be reported in different ways. For example, the assembly 100 can be configured to report at several rates including periodically and on request, in seconds. When the assembly 100 is configured to report periodically, the reporting period can be set from every second to every hour. When the reporting device 112 is battery powered as described above, the assembly 100 can be configured to report the data every 5 minutes to save power.

The processor 144 will also confirm the status of the reporting device 112, and the communications protocol being used. If the reporting device 112 is disconnected, the transducer body 108 will detect the detachment or removal in the same way that the transducer body 108 detects the transducer head 104 being disconnected. If the reporting device 142 has been disconnected, the assembly 100 will enter into a listening mode and wait for a command to start reporting. If the protocol changes, then the transducer body 108 will detect the change and send the data in the correct format/protocol.

There are factory test commands that a host computer can use to calibrate the electronics of the transducer body 108 so that the transducer head 108 will respond the same way with every transducer assembly. All transducers will also be calibrated from the factory. At step 194, the assembly 100 will identify any special command from the connecting reporting device. Once identified, the special commands will be acted upon. Exemplary commands include factory calibration and test command, user calibration and configuration change, and request for data download. Specifically, a user generally has a list of commands that can be used for field calibration of the measurement. These commands can be sent from a computer, a PLC, or a remote display/keypad interface. Data can also be requested in various formats and with different sample rates. User conversion tables, programmable filters and other options can also be applied.

Once all the hardware adjustments have been made based on transducer information, user requested action and recording equipment status, data is reported in step 198. In normal operation, the calibrated measurement data will be sent in the format required by the reporting device 112. If factory or user commands have been initiated, the assembly 100 will respond appropriately. The flow diagram then repeats. After the assembly 100 has sent data or responded to an inquiry, it will again check the status of transducers, previous measurements, user/factory requests, and attached recording devices. The assembly 100 will then take appropriate action.

Generally, the assembly 100 will report the measurement data at a pre-determined periodic rate. However, the assembly 100 can also be programmed to report a transducer configuration or transducer status instead of measurement readings. For example, the assembly 100 can be configured to report a calibration slope, and calibration offset, or a transducer identification.

Various features and advantages of the invention are set forth in the following claims.

The invention of the claim is:

1. A sensor assembly comprising:
a transducer chosen from among a plurality of transducer types, each type configured to sense a different environmental characteristic;
a memory element coupled to the transducer and configured to store a plurality of transducer signatures, each transducer signature comprising a transducer identifier and calibration parameters; and
a processor coupled to the memory and configured to store an adaptive algorithm, to identify the type of the transducer using the transducer identifier, to configure at least one analog signal conditioning component using the calibration parameters, to process the environmental characteristic using the configured analog signal conditioning component and the adaptive algorithm, and to output the processed environmental characteristic.

2. The sensor assembly of claim 1, and wherein the calibration parameters comprise a transducer temperature compensation parameter.

3. The sensor assembly of claim 1, further comprising a reporting device coupled to the processor and configured to receive and report the processed environmental characteristic from the processor.

4. The sensor assembly of claim 3, and wherein the processor automatically identifies the reporting device, and automatically adjusts the processed environmental characteristic based on the identified reporting device.

5. The sensor assembly of claim 3, and wherein the reporting device comprises at least one of a local display, a personal computer ("PC"), an industrial programmable logic controller ("PLC"), a telemetry system, and a data logging system.

6. The sensor assembly of claim 1, further comprising a transducer preamplifier coupled to the transducer, and configured to amplify the sensed environmental characteristic.

7. The sensor assembly of claim 1, and wherein the processor repeatedly and automatically detects to identify the type of transducer.

8. The sensor assembly of claim 1, and wherein the processor chooses an adaptive algorithm based on the identified type of the transducer.

9. The sensor assembly of claim 1, further comprising at least one signal converter coupled to the transducer and configured to convert the sensed environmental characteristic to a desired output format.

10. The sensor assembly of claim 9, and wherein the at least one signal converter comprises a sigma-delta analog-to-digital converter, and wherein the desired output format comprises digital data.

11. The sensor assembly of claim 1, and wherein the processor calibrates the environmental characteristic with the calibration parameters and the adaptive algorithm.

12. The sensor assembly of claim 1, further comprising a transducer housing configured to house the transducer and the memory element, and a body housing configured to house the processor and coupled to the transducer housing.

13. The sensor assembly of claim 1, further comprising a housing configured to house the transducer, the memory element, and the processor.

14. A sensor assembly comprising:
a sensing head having a transducer chosen from among a plurality of transducer types, each type configured to sense a different environmental characteristic, and a memory element coupled to the transducer and configured to store a plurality of transducer signatures, each transducer signature comprising a transducer identifier and calibration parameters; and
an adapting body coupled to the sensing head, to receive the transducer signatures and the environmental characteristic from the sensing head, the adapting body having a processor configured to store an adaptive algorithm, to identify the type of the transducer using the transducer identifier, to configure at least one analog signal conditioning component using the calibration parameters, and to process the environmental characteristic using the configured analog signal conditioning component and the adaptive algorithm and to generate an output representative of the environmental characteristic.

15. The sensor assembly of claim 14, and wherein the calibration parameters comprise a transducer temperature compensation parameter.

16. The sensor assembly of claim 14, further comprising a reporting device coupled to the processor and configured to receive and report the output from the processor.

17. The sensor assembly of claim 16, and wherein the processor automatically identifies the reporting device, and automatically adjusts the output based on the identified reporting device.

18. The sensor assembly of claim 16, and wherein the reporting device comprises at least one of a local display, a personal computer ("PC"), an industrial programmable logic controller ("PLC"), a telemetry system, and a data logging system.

19. The sensor assembly of claim 14, further comprising a transducer preamplifier coupled to the transducer, and configured to amplify the sensed environmental characteristic.

20. The sensor assembly of claim 14, and wherein the processor repeatedly and automatically detects to identify the type of transducer.

21. The sensor assembly of claim 14, and wherein the processor chooses an adaptive algorithm based on the identified type of the transducer.

22. The sensor assembly of claim 14, further comprising at least one signal converter coupled to the transducer and configured to convert the sensed environmental characteristic to a desired output format.

23. The sensor assembly of claim 22, and wherein the at least one signal converter comprises a sigma-delta analog-to-digital converter, and wherein the desired output format comprises digital data.

24. The sensor assembly of claim 14, and wherein the processor calibrates the environmental characteristic with the calibration parameters and the adaptive algorithm.

25. The sensor assembly of claim 14, and wherein the adapting body comprises at least one of a local data display and a keypad, a personal computer ("PC") communication cable, a programmable logic controller ("PLC") communication cable, a telemetry device, a multi-sensor adapter device, and a data storage device.

26. A method of measuring an environmental characteristic with a transducer assembly, wherein a transducer head is coupled to a transducer body, the transducer head has a memory storing a plurality of transducer signatures, each transducer signature comprises a transducer identifier and calibration parameters, and the transducer body has a processor, the method comprising:
retrieving a transducer identifier and calibration parameters from the memory;
processing the transducer identifier to identify the type of the transducer at the processor;
configuring at least one analog signal conditioning component using the calibration parameters;
sensing a signal indicative of the environmental characteristic using the transducer;
conditioning the signal indicative of the environmental characteristic using the processor with the configured analog signal conditioning component and an adaptive algorithm; and
outputting the conditioned signal indicative of the environmental characteristic.

27. The method of claim 26, and wherein the calibration parameters comprise a transducer temperature compensation parameter.

28. The method of claim 26, and wherein outputting the conditioned signal indicative of the environmental characteristic further comprises:
coupling the transducer body to a reporting device; and
reporting the conditioned signal indicative of the environmental characteristic on the reporting device.

29. The method of claim 28, further comprising:
automatically identifying the reporting device; and
automatically adjusting the conditioned signal indicative of the environmental characteristic based on the identified reporting device.

30. The method of claim 28, and wherein the reporting device comprises at least one of a local display, a personal computer ("PC"), an industrial programmable logic controller ("PLC"), a telemetry system, and a data logging system.

31. The method of claim 26, further comprising amplifying the signal indicative of the environmental characteristic.

32. The method of claim 26, wherein processing the transducer identifier to identify the type of the transducer at the processor further comprises repeatedly and automatically detecting to identify the type of the transducer.

33. The method of claim 26, further comprising choosing an adaptive algorithm based on the type of the transducer.

34. The method of claim 26, wherein outputting the conditioned signal indicative of the environmental characteristic further comprises formatting the signal indicative of the environmental characteristic.

35. The method of claim 34, wherein the signal indicative of the environmental characteristic is in an analog format, the method further comprising converting the environmental characteristic from the analog format into a digital format using a sigma-delta conversion.

36. The method of claim 26, wherein conditioning the signal indicative of the environmental characteristic using the processor further comprises calibrating the environmental characteristic.

37. The method of claim 26, and wherein the transducer body comprises at least one of a local data display and a keypad, a personal computer ("PC") communication cable, a programmable logic controller ("PLC") communication cable, a telemetry device, a multi-sensor adapter device, and a data storage device.

38. A sensor adapter operably configured to receive a transducer, the transducer configured to sense data indicative of an environmental characteristic and having a memory configured to store a transducer identifier and calibration parameters, the sensor adapter comprising:
a processor configured to receive, from the transducer, the data indicative of the environmental characteristic, the transducer identifier, and the calibration parameters, to identify the type of the transducer using the transducer identifier, to configure an analog signal conditioning circuit based on the calibration parameters, and to adaptively process the received data from the transducer using the configured analog signal conditioning circuit and an adaptive algorithm; and
an output interface configured to receive the processed data from the processor and to report the processed data.

39. The sensor adapter of claim 38, and wherein the processor is configured to automatically identify a reporting device coupled to the output interface.

40. The sensor adapter of claim 38, and wherein the processor is configured to choose the adaptive algorithm based on the identified type of the transducer.

* * * * *